(12) United States Patent
Leeman (10) Patent No.: US 7,503,141 B1
(45) Date of Patent: Mar. 17, 2009

(54) GRID CONNECTOR AND BAIT BASKET

(75) Inventor: David E. Leeman, Freeport, ME (US)

(73) Assignee: Leeman, LLC, Freeport, ME (US)

( * ) Notice: Subject to any disclaimer, the term of this patent is extended or adjusted under 35 U.S.C. 154(b) by 12 days.

(21) Appl. No.: 10/782,823

(22) Filed: Feb. 23, 2004

Related U.S. Application Data (60) Provisional application No. 60/449,596, filed on Feb. 26, 2003.

(51) Int. Cl.
*A01K 97/02* (2006.01)

(52) U.S. Cl. .......................... 43/44.99; 43/100

(58) Field of Classification Search ............... 43/42.06, 43/44.99, 54.1, 55, 56, 57, 100, 101, 102, 43/103, 104, 105, 106; 403/177, 386, 329, 403/396, 397; 211/186; 174/48
See application file for complete search history.

(56) References Cited

U.S. PATENT DOCUMENTS

| | | | | | |
|---|---|---|---|---|---|
| 1,497,199 | A | * | 6/1924 | Sutthoff | 99/323 |
| 2,842,890 | A | * | 7/1958 | Goroni | 43/55 |
| 3,036,400 | A | * | 5/1962 | Anderson | 43/55 |
| 3,855,727 | A | * | 12/1974 | Canoy | 43/65 |
| 4,373,286 | A | * | 2/1983 | Robison | 43/10 |
| 4,434,575 | A | * | 3/1984 | Pearson | 43/100 |
| 4,638,588 | A | * | 1/1987 | Abadie | 43/44.99 |
| 4,832,298 | A | | 5/1989 | Metcalf | |
| 4,842,230 | A | * | 6/1989 | Cobb et al. | 248/220.21 |
| 4,852,838 | A | * | 8/1989 | Field | 248/222.13 |
| 4,914,856 | A | * | 4/1990 | Kennedy | 43/55 |
| 5,187,893 | A | * | 2/1993 | Knight | 43/100 |
| 5,249,760 | A | | 10/1993 | Morimoto | |
| 5,526,598 | A | | 6/1996 | Watanabe | |
| 5,606,820 | A | * | 3/1997 | Suddeth | 43/57.1 |
| 5,617,669 | A | * | 4/1997 | Levey | 43/44.99 |
| 6,000,168 | A | * | 12/1999 | Demusz et al. | 43/65 |
| 6,189,489 | B1 | * | 2/2001 | Pearce | 119/477 |

FOREIGN PATENT DOCUMENTS

| | | | |
|---|---|---|---|
| DE | 3525152 | * | 1/1987 |
| GB | 2226743 | * | 7/1990 |
| GB | 2255485 | * | 11/1992 |

* cited by examiner

*Primary Examiner*—David J Parsley
(74) *Attorney, Agent, or Firm*—James Creighton Wray (57) ABSTRACT

A square-shaped locking mechanism is used to attach a device on a wire grid. The locking mechanism is slightly smaller than openings on the wire grid. The locking mechanism is passed through the grid until indents between the locking form and the cylindrical container are in the plane of the wire grid. The cylindrical container and locking mechanism are rotated 45 degrees, until the wire grid becomes trapped between the device that is being mounted and the corners of the locking device. This locks the device in place. This locking mechanism is particularly useful for securing bait containers inside fishing traps. A novel bait container is a cylinder with halves that open on hinges. The container has mechanisms that ensure that the container remains closed during use and has features to improve grip during operation.

38 Claims, 6 Drawing Sheets

FIG. 9
Bait Container

FIG. 10
Press ends to open

FIG. 11
Bait Container hinges open

FIG. 12
Bait Container in fully open position

FIG. 13

Bait Container Wire Lock

FIG. 14

Wire Lock twists in to position to secure

GRID CONNECTOR AND BAIT BASKET

This application claims the benefit of U.S. Provisional Application No. 60/449,596, filed Feb. 26, 2003.

BACKGROUND OF THE INVENTION

There are many mechanisms sold that are intended to secure other devices to wire grids. However, there are no inexpensive and easy to use devices that exist, for example, to quickly attach bait containers to the inside of fishing traps and other devices.

Current devices for attaching objects to wire grids are mainly used for shelving merchandise in retail stores. Other uses involve mounting objects to walls for display or other types of viewing. None of these methods are satisfactorily secure and/or easy to use.

Needs exist for improved mechanisms that attach devices to wire grids. Needs also exist for simpler and easier to use bait containers that can be attached to wire grids inside fishing traps and other similar devices.

SUMMARY OF THE INVENTION

The present invention provides a new grid connector, new locking mechanism and new bait container. As an example, the new locking mechanism is particularly useful for bait containers. The new grid connectors are useful for many applications and are particularly useful for holding bait containers inside fishing traps. However, the locking mechanism is also useful for traditional uses, such as hanging objects on wire grids for display. The grid connector and locking mechanisms are designed to securely hold objects to grids and, specifically, bait containers to wire grids used in the fishing industry. The new bait container is easy to use under real conditions.

The locking mechanism of the present invention is attached to an object that is to be attached to a grid. The locking mechanism may be an integral molded part of the object or attached by outside means. The locking mechanism is roughly square-shaped and slightly smaller than openings in a given wire grid. In order to use the locking mechanism as a grid connector, the locking mechanism passes through the openings in the wire grid and then rotated 45 degrees. During rotation step, the wire grid engages undercuts on the locking mechanism. When the wire from the wire grid engages the undercuts, the container or other device is securely attached to the wire grid via the locking mechanism. The wire from the wire grid is trapped between the locking mechanism and the container being hung.

The present invention is particularly useful for the fishing industry when used to secure bait containers inside fish traps or other devices. The bait container of the present invention is a novel device made of plastic or other suitable material, with openings that allow trapped animals minimal access to the enclosed bait. The bait container is cylindrical and divided into two halves. The container is opened and closed using one or more hinges located between the two halves. Preferably, three hinges are used as a set. In order to hold the two halves together during operation, protrusions on the ends of one of the halves fit under tabs on the opposite half. Additionally, a protrusion inside one half of the locking mechanism fits into a receptacle on the opposite half. Pressing inward on the ends of the container and spreading the two halves apart opens the container. Pressing the two halves together closes the container.

To assist the operator during use, arc-shaped grooves are placed on the ends of the cylinder to improve grip. Additionally, dimples are spaced along the outsides of the container to prevent slipping during use.

These and further and other objects and features of the invention are apparent in the disclosure, which includes the above and ongoing written specification, with the drawings.

DETAILED DESCRIPTION OF THE PREFERRED EMBODIMENTS

The present invention provides a new grid connector, new locking mechanism and new bait container. As an example, the new locking mechanism is particularly useful for holding bait containers inside fishing traps. However, the locking mechanism is also useful for traditional uses, such as hanging objects on wire grids for display. The grid connector and locking mechanisms are designed to securely hold objects to grids, and, specifically, bait containers to wire grids used in the fishing industry. The new bait container is easy to use under real life conditions.

Figure 1:
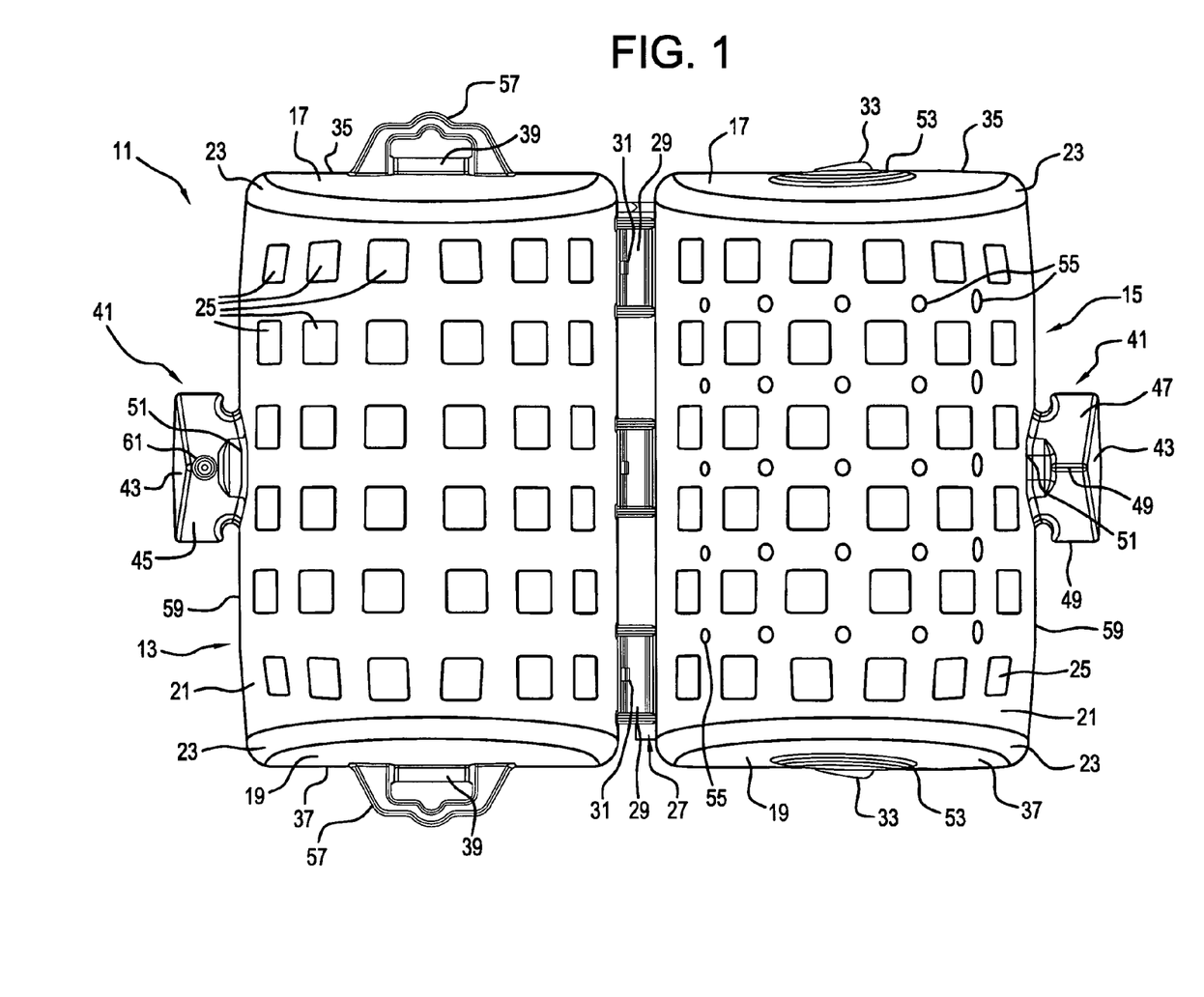
FIG. 1 is an elevational view of the outside of the container in a fully open position.

FIG. 1 shows a bait container 11 in a fully open position. The bait container 11 is made of molded plastic or other material suitable for use in aquatic environments. The cylindrical bait container 11 is divided into two roughly equal halves 13, 15. Each half 13, 15 has a top surface 17, bottom surface 19 and a side surface 21. The cylindrical container 11 may have sharp or rounded edges 23.

The two halves 13, 15 are covered with one or more openings 25. Preferably, the one or more openings are rows of symmetrical rectangular openings 25. The openings 25 pass entirely though the walls of the side surfaces 21. These rows of openings 25 allow limited access by trapped fish to bait enclosed in the bait container 11, not allowing trapped animals to consume all of the bait.

The two halves 13, 15 of the bait container 11 open 180-degrees from a fully closed position to a fully open position with the assistance of one or more hinges 27. Preferably, three hinges 27 are used. The hinges 27 are made of vertical bars 29, on half 13 of the cylindrical container, that lock into half circle depressions 31, on the opposite half 15 of the cylindrical container.

When fully closed, the bait container 11 of the present invention is held closed by multiple mechanisms. Two identical mechanisms are located on opposite ends 17, 19 of the cylindrical bait container 11. Molded protrusions 33 are located on both ends 17, 19 of one half of the cylinder 15. The molded protrusions 33 extend away from the center of the bait trap 11, starting from edges 35, 37 of the top 17 and bottom 19 surfaces, respectively, of the half cylinder 15. Molded tabs 39 extend away from the center of the bait trap 11, starting from edges 35, 37 of the opposite half cylinder 13. When the two halves 13, 15 are brought together, the molded protrusions 33 on side 15 slide underneath the molded tabs 39 on the opposite side 13 of the bait container 11. Once the molded protrusions 33 are completely under the tabs 39, the highest point of the protrusions 33 pop up behind the tabs 39. This secures the two halves 13, 15 together.

Another mechanism to lock the two halves 13, 15 together is a grid connector locking mechanism 41. The locking mechanism 41 is generally square in shape, when viewed from above a top surface 43. In a preferred embodiment, the locking mechanism 41 is attached to the bait container 11 along the split between the two halves 13, 15. Thus, the locking mechanism is split into two equal halves 45, 47 along the same division as the cylinder halves 13, 15. The square-shape of the locking mechanism 41 should be slightly smaller than the openings of a wire grid where the bait container 11 is to be placed. When the cylinder 11 is held vertically, the locking mechanism 41 is aligned with the corners 49 of the square facing up, down and to either side. The locking mechanism 41 is split into halves 45, 47 from the top to bottom corner 49. The locking mechanism 41 is attached to the halves 13, 15 of the bait trap 11 by a base 51.

Other features of the present invention include means for improving grip. Concentric ridges 53 may be included on the top 17 and bottom 19 surface of a half 15 of the cylinder 11. These ridges 53 provide the user with more control when opening and closing the bait trap 11 under wet conditions. Other features that improve grip are dimples 55 placed strategically around the side 21 of the bait trap 11. Additionally, hangers 57 may be added in order to facilitate storage of the bait container 11 when not in use. The hangers 57 allow the device 11 to be hung from hooks. These features may be molded into the bait container 11 itself of attached by outside means.

Operation of the bait basket 11 involves opening and closing of the two halves 13, 15. To separate the two halves 13, 15 of the bait container 11, both ends 17, 19 of one half 15 of the bait container 11 are pressed toward the center of the bait container 11. At the same time the two halves 13, 15 are separated. By pressing in on the ends 17, 19 of half 15, the molded protrusions 33 are depressed under the tabs 39, allowing the protrusions 33 to swing out from under the tabs 39. Once the protrusions 33 are free of the tabs 39, the user can release pressure on the ends 17, 19. To close the bait basket 11, the process is reversed. The halves 13, 15 are pressed towards each other until the edges 59 of each half 13, 15 meet.

Figure 2:
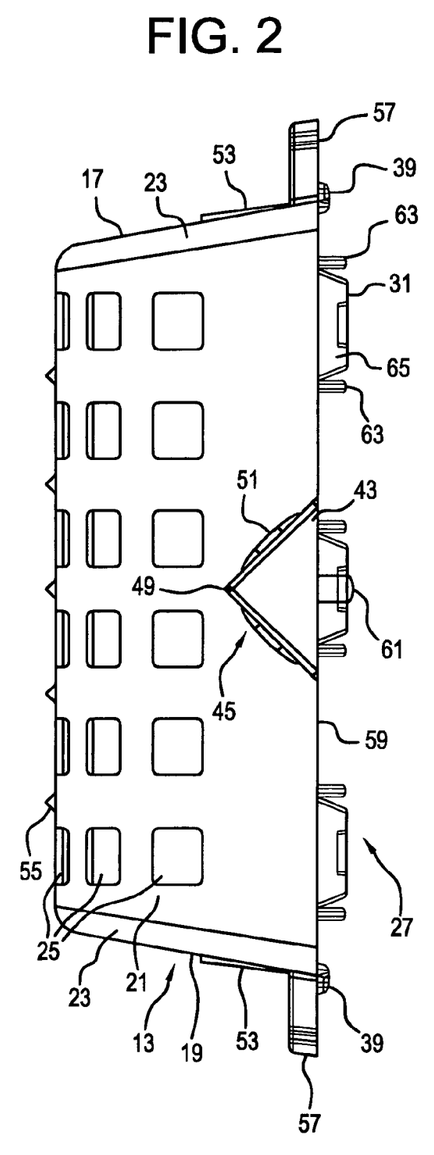
FIG. 2 is a side elevation of one half of the container.
Figure 3:
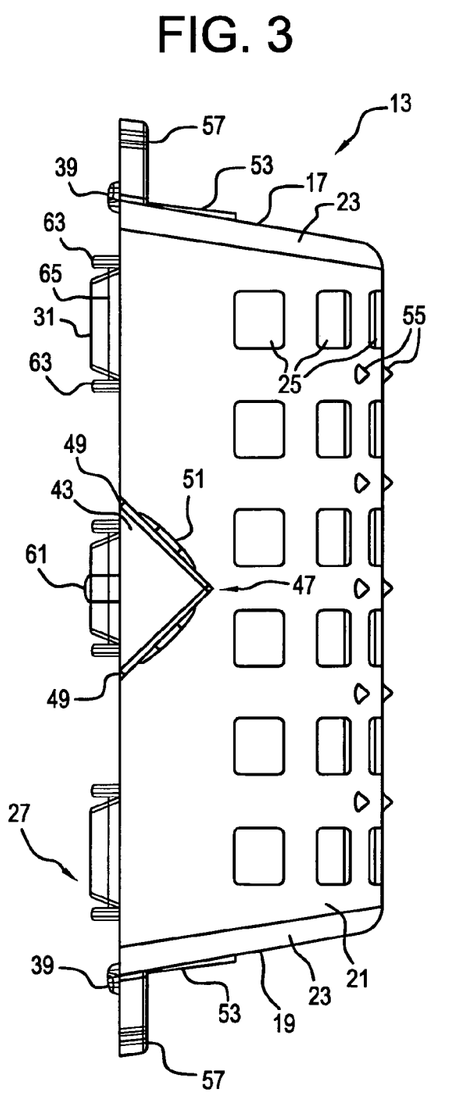
FIG. 3 is a side elevation of the opposite half of the container.

FIGS. 2 and 3 show half of the fully opened bait container 11 from both sides, looking at the locking mechanism 41. The locking mechanism 41 is generally hollow. Inside the hollow locking mechanism 41, a protrusion 61 on one half 13 of the cylinder 11 fits tightly into a receptacle 63 on the other half 15 of the container 11. The meeting of the protrusion 61 and receptacle 63 aligns the two halves 13, 15 of the locking mechanism 45, 47 and further secures the two halves 13, 15 of the cylinder 11 together. The hinges 27 are shown with only the half circle depressions 31. The half circle depressions 31 include ends 63 and central casings 65 for each hinge 27.

Figure 4:
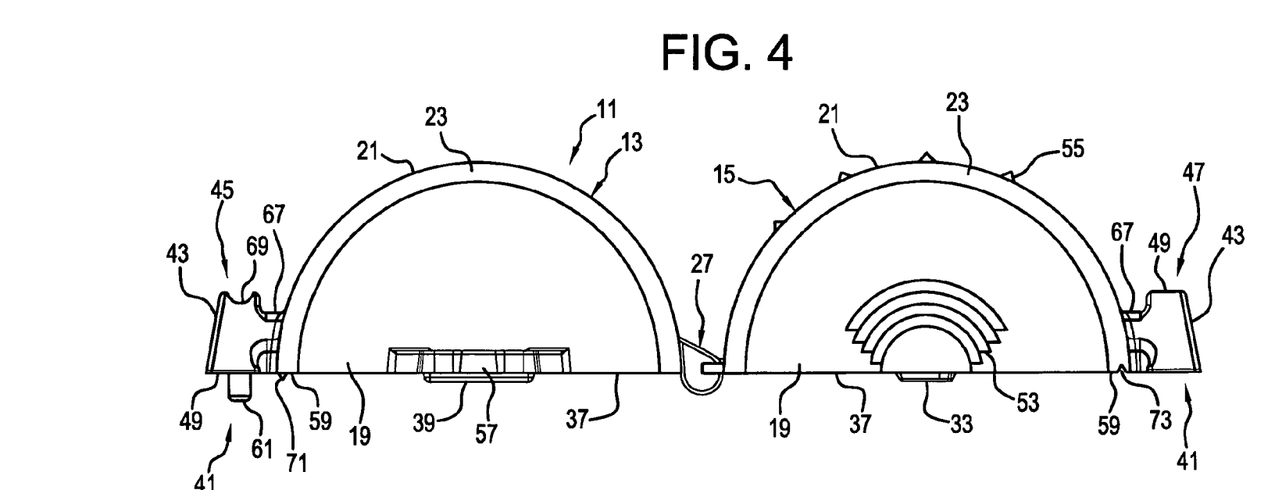
FIG. 4 is an end view of container in a fully opened position.
Figure 5:
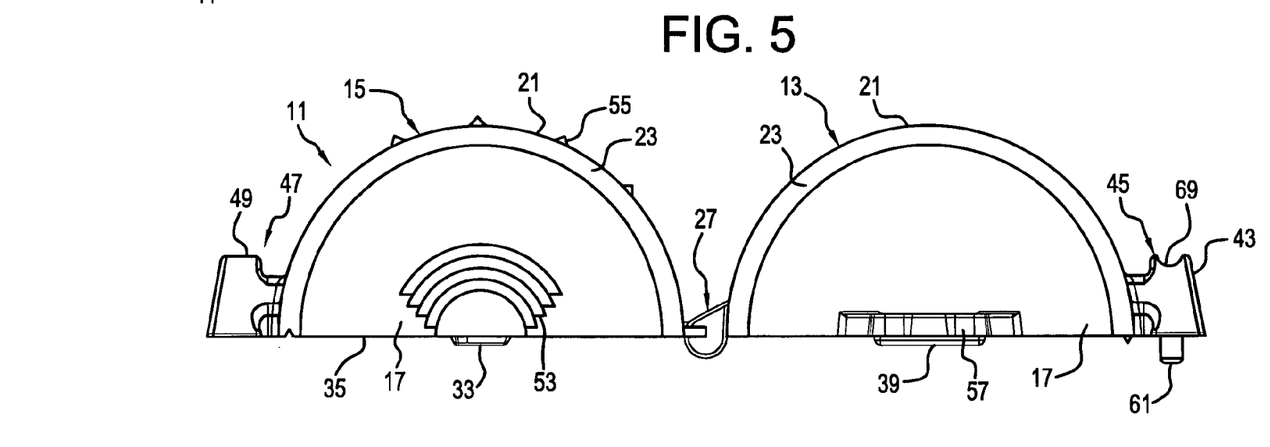
FIG. 5 is an opposite end view of the container in a fully open position.

FIGS. 4 and 5 show a fully opened bait container 11 when looking at the ends 17, 19. The arc-shaped grooves 53 are shown on cylinder half 15 along with protrusion 33. On the other cylinder half 13, the tab 39 is shown as well as the protrusion 61. Other features visible in this view are undercuts 67 located below the top surface 43 of the locking mechanisms 41 and above the side surface 21 of the cylinder halves 13, 15. The locking mechanisms 41 may also have indentations 69 due to the molding of protrusions 61.

It is also possible to have another method of securing the two halves 13, 15 together. This includes molded protrusions 71 and corresponding depressions 73 located on the edges 59 of each half 13, 15. As the halves 13, 15 are brought together, the protrusions 71 fit into the corresponding depressions 73 to further secure the device 11 closed.

Figure 6:
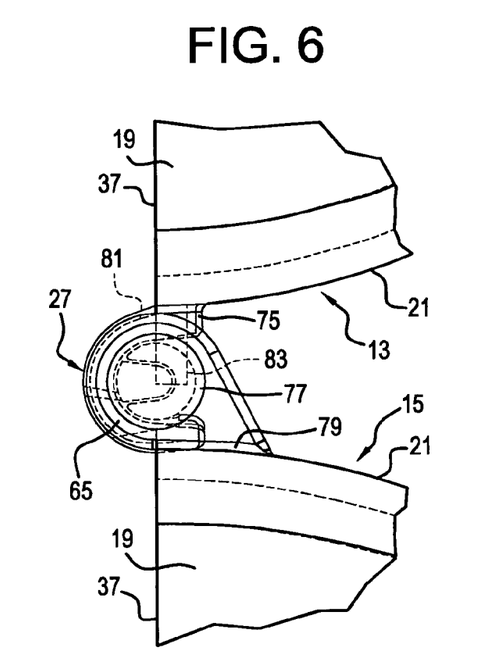
FIG. 6 is an enlarged cross-sectional view of a hinge.

FIG. 6 is a close up view of one of the hinges 27. Generally, a set of three hinges 27 connects the bait container halves 13, 15 to each other. One edge 75 of a U-shaped, large outer semi-cylinder section 31 of the hinge 9 is connected along an edge 21 of one half 13 of the cylinder 11. A smaller, inner semi-cylindrical section 77 of the opposite side of the hinge 27 is connected by end lugs 79 to a complementary edge 21 of the other half 15 of the cylinder. An outer edge 81 of outer semi-cylindrical section 65 has an inward and outward extending lip 83 to hold this inner hinge element 77 in the outer hinge element 65. The outward extension of the lip 83 engages the surface of side 13, between the lugs 79, to prevent excessive opening of the sides 13, 15. The cylindrical section 77 of the hinge 27 snaps into the u-shaped section 65 of the hinge 27. When the hinge 27 is complete, it allows for rotation of the bait container halves 13, 15 from a fully closed position through 180 degrees to the fully open position.

Figure 7:
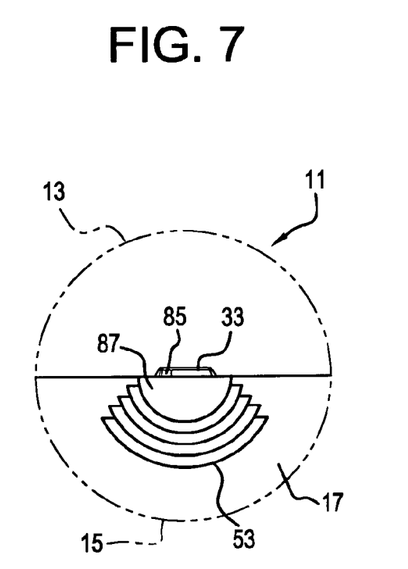
FIG. 7 is an enlarged end view of the arc-shaped ridges on the top of the container.

FIG. 7 is a close up view of the top of one half 5 of the bait container 1. The arc-shaped grooves 53, used for improved handling, are shown. Also shown is the protrusion 33, with an extended section 85 that fits under the tab 39. Pressing on a center section 87 and pulling the two halves 13, 15 apart, close the bait trap 11.

Figure 8:
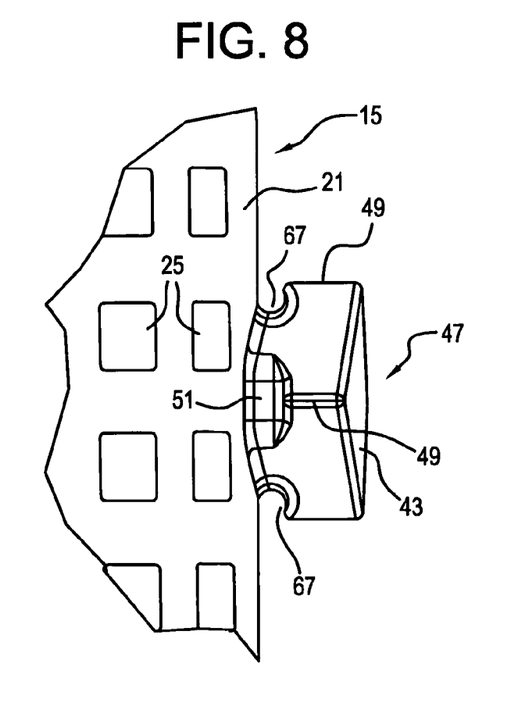
FIG. 8 is an enlarged side view of the grid connector.

FIG. 8 is a side view of the locking mechanism 41. Half of the locking mechanism 47 is shown. Undercuts 67 are shown where a wire grid is engaged during the locking procedure.

Figure 9:
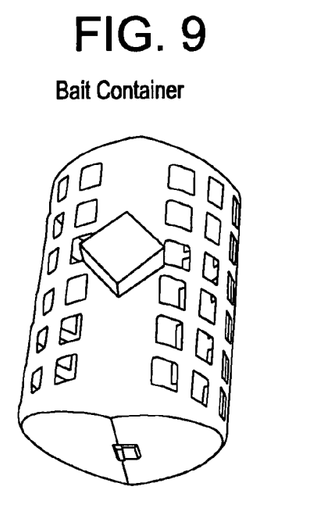
FIG. 9 is an image of the closed container.
Figure 10:
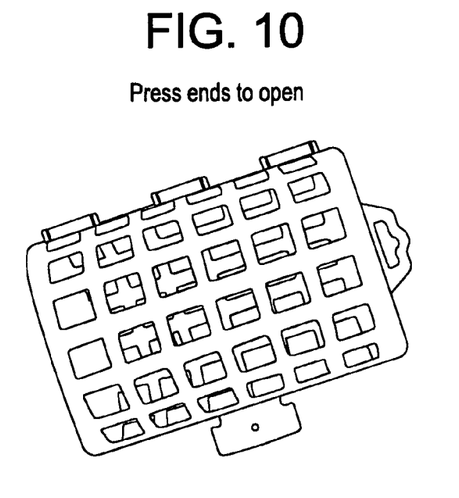
FIG. 10 is an image showing the ends of the container being pressed to open the container.
Figure 11:
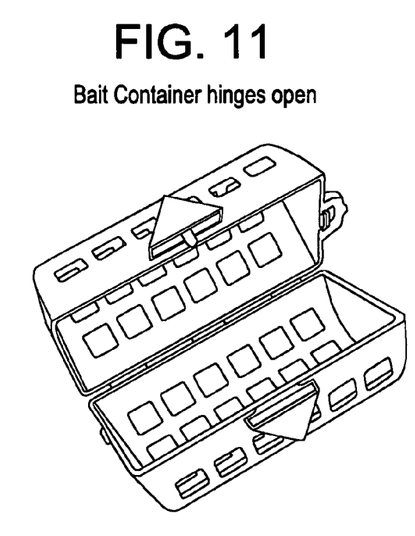
FIG. 11 is an image showing the container partially opened around the hinges.
Figure 12:
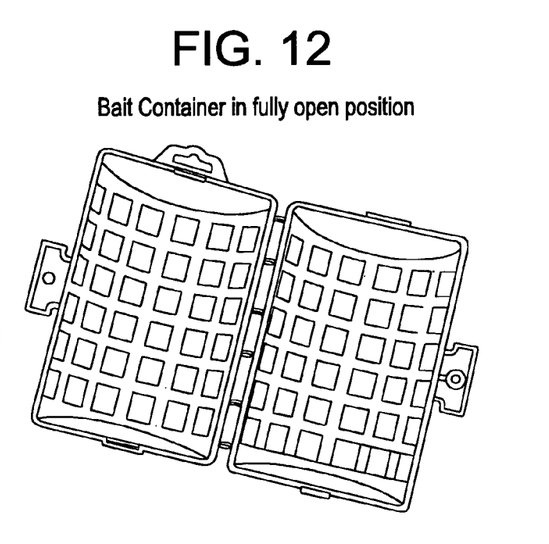
FIG. 12 is an image showing the container in the fully opened position.

FIGS. 9 through 14 are diagrams showing the operation of the bait container 11. FIG. 9 shows the bait container 11 in the fully closed position. FIG. 10 shows the operator pressing the ends of the cylinder 11 to slide the protrusions 33 under the tabs 39. FIG. 11 shows the bait container 11 with the hinges 27 opening. FIG. 12 shows the bait container 11 with the hinges 27 fully opened.

Figure 13:
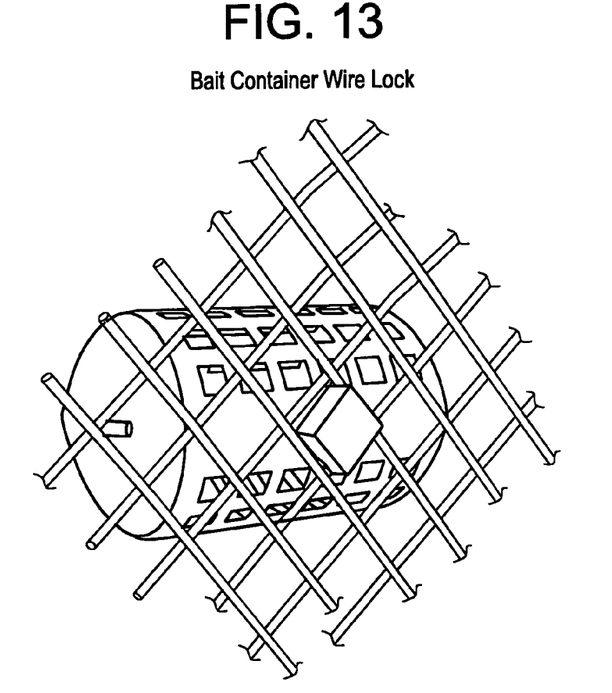
FIG. 13 is an image showing the locking mechanism being fitted through a wire grid.
Figure 14:
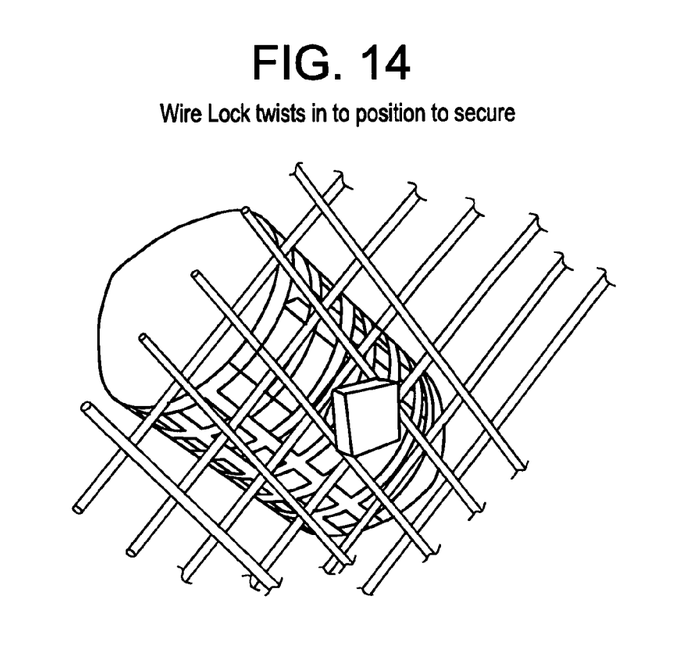
FIG. 14 is an image showing the container and grid connector twisted, snapped into place and secured in place on a wire grid.

FIG. 13 shows the bait container with the locking mechanism 41 protruding through the wire grid. The square locking mechanism 41 is slightly smaller than the wire grid openings. The bait container 11 can be mounted on either a vertical or horizontal grid depending on the intended use. Once the locking mechanism is completely through the wire grid, the bait container 11 is rotated 45 degrees to lock the device 11 in place. This rotation allows the undercuts 67 to be engaged around the wire grid. FIG. 14 shows the final position of the bait container 11 when it is secured to the wire grid.

While the invention has been described with reference to specific embodiments, modifications and variations of the invention may be constructed without departing from the scope of the invention.

The invention claimed is:

1. Apparatus comprising: bait basket
having first and second pivotally connected halves for forming a complete cylindrical container,
top, bottom and side surfaces in each of the first and second halves of the cylindrical container,
one or more openings in the side surfaces of the cylindrical container halves,
one or more hinges on edges of said side surfaces, said hinges pivotally connecting the first half to the second half,
raised regions on the top and bottom of at least one of the cylindrical container halves for improving grip,
protrusions and tabs on edges of the surfaces of the first and second halves for locking the cylindrical container closed, and
protrusions and tabs on edges of the top and bottom surfaces of the first and second halves for locking the cylindrical container closed,
an extension forming a lock mechanism projecting from the bait basket,
wherein the extension has an enlarged, generally rectangular top surface that is larger than a generally rectangular base of the extension which is connected to the cylindrical container,
a plurality of undercuts formed in the extension adjacent to the base of the extension, said undercuts forming a gap between the top surface of the extension and the cylindrical container,
wherein the enlarged, generally rectangular top surface and the generally rectangular base of the extension are both smaller in dimensions than the generally rectangular openings in a wire grid so that the top surface of the extension is adapted to be inserted into and extended entirely through at least one of the openings of the wire grid,
wherein where the entire extension including the top surface of the extension is inserted through one of the generally rectangular openings in the wire grid until the undercuts which form the gap are in the plane of the wire grid and the extension and cylindrical container are rotated roughly 45 degrees,
one or more of the undercuts forming said gap receive the wire grid, and
the wire grid is locked into the undercuts between said top surface of the extension and said cylindrical container.

2. The apparatus of claim 1, wherein the undercuts are located on opposite corners of the extension.

3. The apparatus of claim 1, wherein the extension is integrally molded with the cylindrical container.

4. The apparatus of claim 1, wherein the extension is separately attached to the cylindrical container.

5. The apparatus of claim 1, wherein the locking mechanism is split in half, forming two equilateral halves.

6. The apparatus of claim 5, further comprising a protrusion on one half of the locking mechanism and a corresponding receptacle on the opposite half of the locking mechanism.

7. The apparatus of claim 6, wherein the protrusion fits into the receptacle to create a locked, complete locking mechanism.

8. The apparatus of claim 1, wherein the bait basket is used inside fishing traps.

9. The apparatus of claim 1, wherein the cylinder is plastic.

10. The apparatus of claim 1, wherein the one or more openings are rectangular.

11. The apparatus of claim 1, wherein the one or more openings are arranged in rows.

12. The apparatus of claim 1, wherein the raised regions are concentric ridges on the top and bottom surfaces of the cylindrical container.

13. The apparatus of claim 1, wherein the raised regions are dimples along the outside surface of the cylindrical container.

14. The apparatus of claim 1, wherein the one or more hinges are three hinges.

15. The apparatus of claim 1, further comprising a loop for hanging the apparatus when not in use.

16. The apparatus of claim 1, wherein the hinges are vertical bars on half of the cylindrical container that lock into half circle depressions on the opposite half of the cylindrical container.

17. The apparatus of claim 1, wherein the first and second halves are closed by pushing two halves together and locking the protrusions into the tabs.

18. The apparatus of claim 1, wherein the first and second halves are opened by applying pressure to the top and bottom surfaces and pulling the first and second halves away from one another.

19. A bait trap with locking mechanism comprising:
first and second pivotally connected halves for forming a complete cylindrical container,
top, bottom and side surfaces on each of said first and second halves of the cylindrical container,
one or more openings in the side surfaces of the cylindrical container halves,
one or more hinges on edges of said side surfaces, said hinges pivotally connecting the first half to the second half,
raised regions on the top and bottom of at least one of the cylindrical container halves for improving grip,
protrusions and tabs on edges of the top and bottom surfaces of the first and second halves for locking the cylindrical container closed,
an extension forming a locking mechanism projecting from the cylindrical container,
said extension configured to be inserted through and disposed in one of a plurality of generally rectangular openings in a wire grid,
the extension has an enlarged, generally rectangular top surface that is larger than a generally rectangular base of the extension which is connected to the cylindrical container, and wherein said enlarged, generally rectangular top surface and said generally rectangular base of said extension are both smaller in dimensions than a generally rectangular opening in the wire grid so that the top surface of the extension is adapted to be inserted into and extend entirely through at least one of the openings of the wire grid,
a plurality of undercuts formed in the extension adjacent to the base extension, said undercuts forming a gap between the top surfaces of the extension and the side surface of the cylindrical container,
wherein when the entire top surface of the extension is inserted through one of the generally rectangular openings in the wire grid until the undercuts which form the gap are in the plane of the wire grid and the extension and cylindrical container are rotated roughly 45 degrees,
one or more of the undercuts forming said gap receive the wire grid, and
the wire grid is locked into the undercuts between said top surface of said extension and said side surfaces of said cylindrical container.

20. The apparatus of claim 19, wherein the bait trap is used inside fishing traps.

21. The apparatus of claim 19, wherein the cylinder is plastic.

22. The apparatus of claim 19, wherein the one or more openings are rectangular.

23. The apparatus of claim 19, wherein the one or more openings are arranged in rows.

24. The apparatus of claim 19, wherein the raised regions are concentric ridges on the top and bottom surfaces of the cylindrical container.

25. The apparatus of claim 19, wherein the raised regions are dimples along the outside surface of the cylindrical container.

26. The apparatus of claim 19, wherein the one or more hinges are three hinges.

27. The apparatus of claim 19, further comprising a loop for hanging the apparatus when not in use.

28. The apparatus of claim 19, wherein the hinges are vertical bars on half of the cylindrical container that lock into half circle depressions on the opposite half of the cylindrical container.

29. The apparatus of claim 19, wherein the first and second halves are closed by pushing two halves together and locking the protrusions into the tabs.

30. The apparatus of claim 19, wherein the first and second halves are opened by applying pressure to the top and bottom surfaces and pulling the first and second halves away from one another.

31. The apparatus of claim 19, wherein the extension is square shaped.

32. The apparatus of claim 19, wherein the wire grid is a vertical grid, and said cylindrical container is mounted on said vertical grid.

33. The apparatus of claim 19, wherein the undercuts are located on opposite corners of the extension.

34. The apparatus of claim 19, wherein the extensions are integrally molded with the cylindrical container.

35. The apparatus of claim 19, wherein the extensions are separately attached to the cylindrical container.

36. The apparatus of claim 19, wherein the locking mechanism is split in half, forming two equilateral halves.

37. The apparatus of claim 36, further comprising a protrusion on one half of the locking mechanism and a corresponding receptacle on the opposite half of the locking mechanism.

38. The apparatus of claim 37, wherein the protrusion fits into the receptacle to create a locked, complete locking mechanism.

* * * * *